Jan. 22, 1963 J. H. TARRANT ETAL 3,074,341
MEANS FOR SUPPLYING BREWING WATER TO COFFEE URNS
Filed Jan. 3, 1961

JAMES H TARRANT
ROBERT B. ANDERSON
INVENTORS

BY *Lyon+Lyon*

ATTORNEYS

United States Patent Office 3,074,341
Patented Jan. 22, 1963

3,074,341
MEANS FOR SUPPLYING BREWING WATER
TO COFFEE URNS
James H. Tarrant, Los Angeles, and Robert B. Anderson, Altadena, Calif., assignors, by mesne assignments, to Farmer Bros. Co., Torrance, Calif., a corporation of California
Filed Jan. 3, 1961, Ser. No. 80,173
2 Claims. (Cl. 99—305)

This invention relates to means for supplying brewing water to coffee urns. Conventional coffee urns include one or more urn jars mounted within a heated water jacket. A basket containing a charge of coffee is placed over each urn jar, and water is withdrawn from the water jacket into a container which is lifted manually and the hot water poured into the basket, so that it may flow downwardly through the charge of coffee into the urn jar.

Included in the objects of the present invention are:

First, to provide a means for supplying water to coffee urns of the above-described type wherein the water is introduced upwardly through a tube disposed centrally in the urn jar and extending through the coffee basket.

Second, to provide a means for supplying water to coffee urns which eliminates the labor and the hazard of manually filling containers and pouring the hot water into the coffee baskets.

Third, to provide a means for supplying brewing water wherein the brewing water is supplied from a pressure line, which is caused to circulate in heat-exchange relation with the heated water in the urn jacket, then introduced into the brewing basket.

Fourth, to provide a means of supplying brewing water which does not interfere with or complicate the use of the brewing basket. That is, the brewing basket may be loaded with a charge of coffee, readily positioned over the urn jar, and when the brewing cycle is completed, the brewing basket may as readily be removed with the coffee grounds.

With the above and other objects in view, as may appear hereinafter, reference is directed to the accompanying drawings in which.

Figure 1:
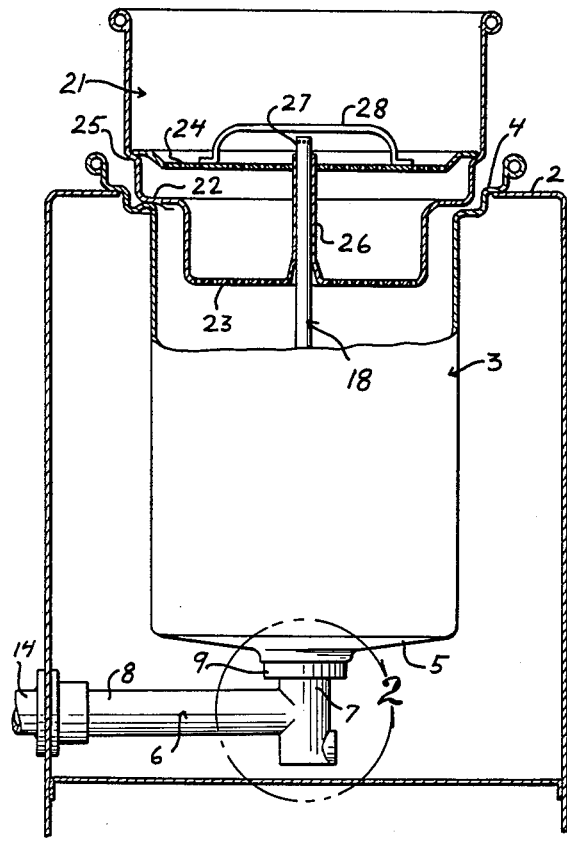
FIGURE 1 is a fragmentary, sectional view of a coffee urn showing the jacket and urn jar and a coffee basket in place, and indicating a portion of the means for supplying brewing water to the urn.

An urn structure for which the present invention is adapted includes a shell structure 1 formed of sheet metal and having an upper deck 2 in which is provided one or more apertures to receive one or more urn jars 3. The urn jar may also be formed of sheet metal and includes a stepped flange 4 at its upper end, the margin of which rests on the margin of the opening in the upper deck 2 so that the urn jar is suspended in the shell structure 1. The space between the urn jar 3 and the shell structure 1 is normally filled with water, which may be heated by any conventional means, such as burners (not shown) located under the shell structure 1, or conventional immersion heaters (not shown).

The urn jar 3 includes a bottom wall 5 having a central opening. Disposed under the urn jar 3 is an outlet body 6 having a vertical portion 7 and a lateral tube portion 8. The upper end of the vertical portion 7 is provided with a flange 9 which underlies the bottom wall 5.

Figure 2:
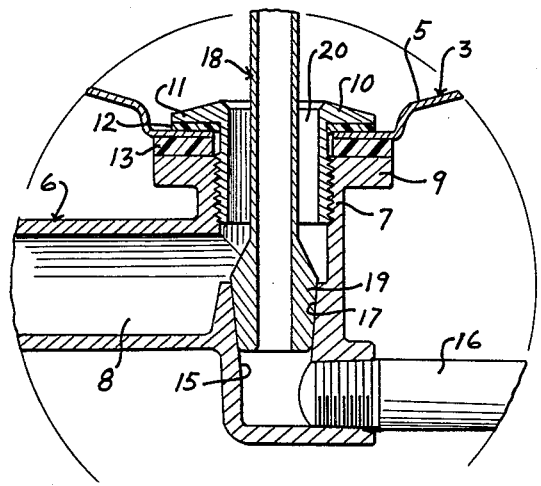
FIGURE 2 is an enlarged view of the combination outlet and brewing water supply means within circle 2 of FIGURE 1.

The vertical portion 7 is internally threaded to receive a tubular clamp nut 10 having a flange 11 disposed above the bottom wall 5, so that when the tubular clamp nut 10 is screwed into the vertical portion 7, the margin of the opening in the bottom wall 5 may be clamped as shown in FIGURE 2. Washers 12 and 13 are interposed between the flanges 9 and 11 to form a sealing connection between the outlet body 6 and the urn jar 3.

The lateral tube portion 8 extends to the front side of the shell structure 1 and is connected to a suitable faucet 14 indicated fragmentarily in FIGURE 1.

The outlet body 6 is provided with an inlet socket 15 which is disposed in coaxial relation with the vertical portion 7. The lower end of the inlet socket 15 is connected to a horizontally extending inlet line 16. The upper end of the inlet socket 15 is provided with a tapered portion 17.

A spray tube 18 is provided with an enlarged externally conical end 19 which fits the tapered portion 17. The spray tube 18 extends vertically upwardly through the tubular clamp nut 10 forming with the tubular clamp nut an annular passage 20 which communicates with the lateral tube portion 8.

The urn jar 3 is adapted to support a coffee basket 21 having a shoulder 22 which rests on a portion of the flanged upper end 4 of the urn jar. The coffee basket 21 is cup-shaped and its bottom end, which extends a short distance into the upper end of the urn jar 3, is perforated as indicated by 23. The coffee basket 21 is adapted to receive a perforated spreader plate 24 which seats on a second shoulder 25 located approximately half way above the bottom of the coffee basket 21. The construction of the coffee basket 21 so far described is conventional.

For the purpose of the present invention, the bottom 23 of the coffee basket 21 is provided with an upstanding tube 26 which receives and guides the upper end of the spray tube 18. The guide tube 26 projects a short distance above the spreader plate 24, and the upper end of the spray tube 18 projects a slight distance above the guide tube 26 and is provided with lateral spray orifices 27. The spreader plate 24 may be provided with a suitable handle 28.

Figure 3:
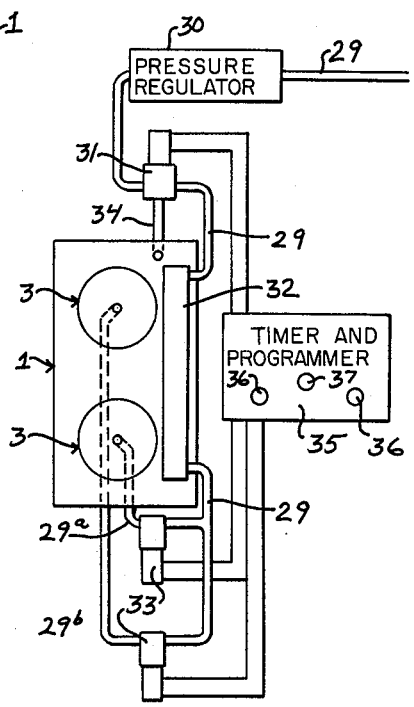
FIGURE 3 is a diagrammatical view illustrating the means for supplying brewing water.

Reference is now made to the diagrammatical view, FIGURE 3. In this view there is indicated a water inlet line 29 in which is interposed a pressure regulator 30. Also interposed in the inlet line 29, in series relation, is a three-way solenoid valve 31 and one or more heat exchangers 32. The heat exchangers are located within the jacket formed by the shell structure 1 so that water in the inlet line 29 is heated by the water contained in the urn jacket. The water inlet line 29 continues from the heat exchanger 32 to the urn jar 3.

If two urn jars are provided as shown in FIGURE 3, the inlet line 29 is divided to form branch lines 29a and 29b. Interposed in each branch line is a solenoid metering valve 33. The three-way solenoid valve 31 is connected to an expansion tube 34 which leads from the three-way valve 31 to the shell structure 1, terminating in the water tank.

The solenoid valves 31 and 33 are electrically connected to a suitable electrical timer and programmer 35 having control buttons 36 for each of the solenoid metering valves 33 and a control button 37 for the three-way valve 31.

Operation of the means for supplying brewing water to coffee urns is as follows:

The three-way valve 31 is so arranged that it normally closes flow through the water inlet line 29 and heat exchanger 32. Under this condition of the solenoid valve 31, the inlet line beyond the valve 31 including the heat exchanger 32 is open to atmospheric pressure through the expansion tube 34.

The solenoid metering valves 33 are normally closed.

The metering valves are electrically interconnected individually with the three-way valve 31 so that, when either of the metering valves is open, the three-way valve closes the expansion tube 34 and opens the water inlet line 29 in order that water may flow therethrough from the pressure regulator.

Assuming that the heat exchanger 32 and the water inlet line 29 have been previously filled with water, opening of either solenoid metering valve 33 permits hot water to flow into the inlet socket 15 and upwardly through the spray tube 18 so as to discharge over the perforated spreader plate 24, and flow downwardly through a charge of coffee disposed between the spreader plate 24 and the perforated bottom 23, and pass downwardly through the perforated bottom 23 into the urn jar 3.

By providing conventional timing means or otherwise metering the incoming water, discharge from the spray tube 18 may be terminated when the appropriate amount of brewing water has flowed into the urn jar 3. The flow of hot water into the urn jar causes corresponding flow of cold water into the heat exchanger 32.

When the metering valves 33 are closed, the water is trapped in the heat exchanger 32 and is heated to the temperature of the water in the urn jacket. As this water heats, it expands and steam may be given off. The excess water due to expansion and steam, if any, discharges through the expansion tube 34 into the upper side of the urn jacket. During this heating period, the heat exchanger 32 and the inlet line 29 between the three-way valve 31 and metering valves 33 are exposed to atmospheric pressure, and thus are protected from the build-up of vapor pressure which would otherwise occur.

If it is desired, the three-way valve 31 may be adapted for movement to a position in which the expansion tube 34 is connected to the source of water, so that the expansion tube may be utilized to fill the jacket with water from time to time.

It will be observed that the spray tube 18 and the special arrangement whereby it extends upwardly through the urn jar 3 makes possible the spray of water to the coffee without the need of pouring the brewing water into the top of the coffee basket 21. However, the presence of the spray tube 18 extending upwardly into the coffee basket 21 does not interfere with manual placement of the coffee basket on top of the urn jar 3 or removal of the coffee basket therefrom.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. In an urn including a shell structure having an upper deck and at least one urn jar suspended therein, whereby the space surrounding the urn jar within the shell structure forms a hot water compartment, a brewed coffee outlet from the bottom of said urn jar for discharge externally of said shell structure and a coffee basket adapted to be fitted in the upper end of said urn jar, the combination of means for supplying brewing water from a water source, comprising: means for spraying water over the coffee in said coffee basket; a brewing water line connecting said spraying means with a source of water; a heat exchanger interposed in said brewing water line and mounted in heat-receiving relation with the hot water contained in said hot water compartment; a control valve in said brewing water line upstream of said heat exchanger; a lateral tube extending from said control valve into said hot water tank for discharge therein; said control valve having a first position interconnecting said lateral tube with said water source to supply makeup water to said hot water compartment, a second position closing said lateral tube and connecting said heat exchanger with said water source, and a third position isolating both said heat exchanger and said lateral line from said water source and connecting said heat exchanger with said lateral line from said water source and connecting said heat exchanger with said lateral tube, whereby excess water resulting from expansion thereof, as the water is heated in said heat exchanger, is delivered to said hot water compartment.

2. In an urn including a shell structure having an upper deck and at least one urn jar suspended therein, whereby the space surrounding the urn jar within the shell structure forms a hot water compartment, a brewed coffee outlet from the bottom of said urn jar for discharge externally of said shell structure and a coffee basket adapted to be fitted in the upper end of said urn jar, the combination of means for supplying brewing water from a water source, comprising: means for spraying brewing water over the coffee in said coffee basket; a brewing water line connecting said spraying means with a source of water; a heat exchanger interposed in said brewing water line and mounted in heat-receiving relation with the hot water contained in said hot water compartment; a supply valve in said brewing water line operable to supply a predetermined quantity of water to said coffee basket and urn jar; and means operable, when said supply valve is closed, to isolate said heat exchanger from said water source, and to discharge, from the heat exchanger into said hot water compartment, excess water resulting from expansion thereof as the water is heated in said heat exchanger.

References Cited in the file of this patent

UNITED STATES PATENTS

| | | |
|---|---|---|
| 1,882,247 | Levings | Oct. 11, 1932 |
| 2,822,746 | Schwal | Feb. 11, 1958 |